Figure 1:
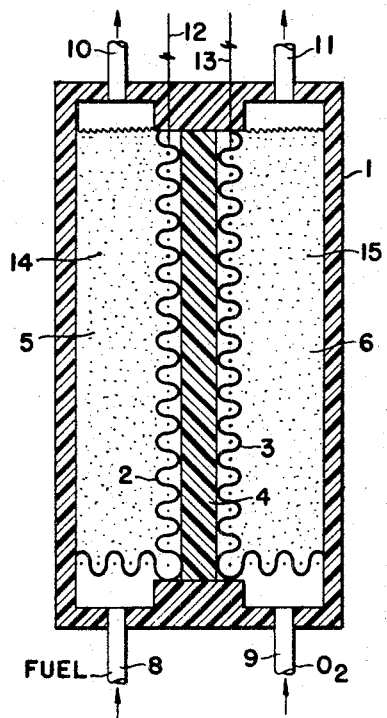

Dec. 29, 1970  W. A. HERBST  3,551,207

FUEL CELL

Filed March 30, 1961

WALTER A. HERBST
INVENTOR

BY Olin B. Johnson
PATENT ATTORNEY

United States Patent Office 3,551,207
Patented Dec. 29, 1970

3,551,207
FUEL CELL
Walter A. Herbst, Union, N.J., assignor to Esso Research and Engineering Company, a corporation of Delaware
Filed Mar. 30, 1961, Ser. No. 99,487
Int. Cl. H01m 27/00
U.S. Cl. 136—86                 8 Claims This invention relates to the production of electrical energy. In particular, this invention relates to a device for converting chemical energy to electrical energy and to a novel process for effecting such conversion. More particularly, this invention relates to a novel fuel cell wherein fuel and oxidant compartments containing an electrolyte slurry of catalyst comprising particulate solids are separated by a central zone containing a catalyst free electrolyte positioned between opposing electrodes.

Since the electrolyte in the fuel compartment will be in contact with the anode and that in the oxidant compartment in contact with the cathode, the aforementioned fuel and oxidant compartments may also be referred to as the anolyte and catholyte compartment respectively. The terms "anode" and "fuel electrode" are used interchangeably herein as are the terms "cathode" and oxygen "electrode."

Thus, one object of the present invention is to provide a fuel cell of high volume efficiency wherein an electrolyte slurry of conductive, catalyst bearing, particulate solids are employed in fuel and oxidant compartments which communicate with a central reactor assembly or unit wherein spaced apart opposing electrodes are in ionic communication with each other through a catalyst free electrolyte extending therebetween.

It is another object of this invention to provide a bipolar design for assembling in series fuel cells employing a slurry of particulate catalyst.

These and other objects will be more fully apparent from more detailed description of the invention hereinafter set forth.

The term "fuel cell" is used in the art to denote a device for directly converting chemical energy released by the oxidation of a combustible fuel to electrical energy. The term "combustible fuel" as used includes hydrogen, hydrogen yielding non-metallic inorganic compounds such as ammonia, carbonaceous fuels such as carbon monoxide and organic compounds. The more adaptable organic compounds include hydrocarbons and oxygen-substituted hydrocarbons such as alcohols, aldehydes, carboxylic acids, etc. The fuel cell differs from the ordinary dry or wet cell storage battery in that fuel and oxidant, e.g. oxygen gas, air, etc., are made continuously available to the cell from an outside source while it is operating as opposed to having the fuel and oxidant stored within the unit. By way of further difference, fuel cell electrodes are neither consumed nor deactived over a reasonable period of time by the reaction occurring within the cell whereas in most conventional batteries at least one electrode is sacrificial, i.e. serves as fuel and is consumed with use. The unique value of the fuel cell lies in its ability to convert chemical energy to electrical energy continuously and with a greater efficiency than conventional means of power production.

The overall fuel cell reaction is a combination of complementary half cell reactions. A fuel cell includes at least one fuel electrode and at least one oxygen electrode, an electrolyte providing ionic conductance between such electrodes, means for passing an oxidizing gas into dual contact with electrolyte and oxygen electrode, means for passing fuel into dual contact with electrolyte and fuel electrode, and means for electron conduction between fuel electrode and oxygen electrode external to such electrolyte.

The term "oxygen electrode" has been used extensively in the fuel cell art as that electrode to which the oxidizing gas employed to effect the cathodic half cell reaction is admitted and hence is employed herein. The term "oxidizing gas," however, may include pure oxygen, oxygen mixed with other elements or compounds, mixtures of oxygen and carbon dioxide, air, etc., and in other embodiments, particularly where the production of chemical products is one facet of the fuel cell operation, may also include other oxidizing materials, e.g. the halogens such as chlorine and bromine. When air is employed as the oxidizing gas the nitrogen component normally does not enter into the fuel cell reaction and must be purged from the cell.

Catalysts are employed in association with both anode and cathode to promote the respective half cell reactions associated therewith. Although certain conductors suitable for electrode construction also have catalytic properties, it has been more feasible to employ the more costly catalytic materials in conjunction with less expensive and more adaptable conductors.

It is a fundamental principle in the design of fuel cells that the rate of electrochemical reaction depends upon the areas within the cell that are simultaneously exposed to the electrolyte, fuel, conductor and catalyst of the anodic half cell and to the electrolyte, oxidant, conductor and catalyst of the cathodic half cell. The desideratum is therefore to bring electrolyte, catalyst, electrode and reactant all into contact with each other at as great a number of reaction sites as possible within the space limitations of the cell.

Heretofore, it has been conventional to employ diffusion type electrodes to serve the dual purpose of admitting fuel and oxidant to the reaction sites and to provide means for receiving and transmitting electrical energy as a part of the electrical circuit. Such electrodes are commonly continuous structures of porous carbon, porous metal or porous containers having inside a rigid conductor surrounded by metal or carbon particles. In each of these electrode types the catalyst either forms an integral part of the electrode base or such base is impregnated with the desired catalyst. In addition certain nondiffusion type electrodes have been employed as the fuel electrode of cells restricted to the use of electrolyte soluble fuel, e.g. alcohols. Here the external surface of the electrode is in contact with a solution of fuel and electrolytes and as in the diffusion type electrodes described the catalyst is a part of or affixed to the electrode base. Systems employing electrodes of the types described have certain inherent deficiencies. Since catalyst, conductor, electrolyte and reactant, i.e., fuel or oxidant, must all be brought together to effect the desired electrochemical half cell reaction only the catalyst positioned at the juncture of these other components is of any value. Or, otherwise stated, in any system wherein such catalyst sites are fixed upon the conductor, activity is inherently limited by the necessity of bringing both electrolyte and reactant into contact with such sites. Obviously, in a system employing fixed catalyst sites catalyst regeneration would be difficult, if not impossible, while the cell is in operation.

It now has been discovered that an effective fuel cell system overcoming difficulties inherent in conventional systems can be produced employing a slurry of catalyst in electrolyte external to and in contact with a central reaction zone. Such reaction zone comprises an anode and a cathode separated by electrolyte and preferably a semipermeable cell divider. The anolyte and catholyte zones contain a particulate catalyst and are designed to admit of intermittent contact of such catalyst with the corresponding electrode in accordance with the principles of this invention as hereinafter set forth in detail.

In accordance with the instant invention the anode and cathode are in all embodiments separated by a central reaction zone containing a medium for the ionic conductance essential to the reaction. The electrodes are spaced from each other by the shortest distance feasible in accordance with the overall design of the cell to reduce voltage loss from internal resistance. In a preferred embodiment the electrodes are separated by a semipermeable cell divider which may be an ion exchange membrane and which is preferably a homogeneous or interpolymer type membrane of low internal resistance, an electrolyte permeable pad of electrolyte resistant fibers, e.g. asbestos, etc., or other forms of porous or electrolyte permeable materials. Either the divider or the electrodes employed must serve as a barrier to catalyst transfer from slurry to the opposing electrode. Such divider is ion permeable and hence allows for some electrolyte transfer between anolyte and catholyte. However, such divider should be essentially impermeable to a flow of fuel and bubbles of unreacted oxygen. The space between electrodes should not exceed about ¼ inch and will ordinarily be less than 0.01 inch when a semipermeable membrane is employed. In another embodiment, the electrodes are designed to prevent catalyst transfer between the anolyte compartment and the catholyte compartment while transfer of ions between compartments is effected through a catalyst-free central electrolyte compartment between the electrodes. Electrolyte is circulated through this central compartment into both the anolyte and catholyte compartments. The latter system is hereinafter discussed in detail.

The catalyst support means employed in accordance with this invention are electrical conductors. Preferably such particles are porous materials, a portion of which are hydrophobic while other portions are hydrophilic. The particles may consist of the desired catalytic metal itself or they may be prepared by catalyst impregnation of other material such as porous carbon or graphite in accordance with methods known in the art. Such methods include soaking the porous carbon structure in aqueous solutions of a salt of the desired metal, decomposing the adsorbed material at elevated temperatures and reduction to the elemental metal under hydrogen. Electrodeposition of the desired catalyst has also proven effective. In either embodiment a portion of the catalyst bearing particle may be coated or otherwise impregnated with "wetproofing materials" by the same methods employed in the art for wetproofing conventional catalyst containing electrodes, e.g. by electrodeposition of fluorocarbon polymers such as polytetrafluoroethylene, polymerization in situ of high molecular weight hydrocarbon polymers such as polypropylene, etc.

In accordance with this invention the electrodes must admit of electrolyte transfer therethrough. Preferably such electrodes are fine mesh wire screen of a suitable electrolyte resistant metal. They may also be constructed of porous sheets of the same materials. The openings in such screens should be smaller than the catalyst comprising particles employed in the anolyte and catholyte.

As explained in greater detail below, the screen or porous sheet performs the primary function of accepting or giving up electrons to catalyst particles. Particles on each side circulate within their zone and repeatedly contact the electrode with which they are associated. At the anode electrons are given up to the electrode while at the cathode they are gathered off the electrode. The ionic transfer between electrodes takes place across the catalyst free portion of the electrolyte, e.g. the electrolyte curtain, or semipermeable membrane.

In accordance with this invention the anolyte and catholyte compartments are charged with particulate solids of a size which will be retained by a 150 mesh screen. Such solids are preferably in the range of about 104 to about 500 microns or above in diameter. Electrolyte is admitted to each compartment and in addition a combustible fuel which may be either a gas or liquid is admitted to the anolyte while an oxidizing gas is admitted to the catholyte.

The agitation created in the anolyte and catholyte zones by the incoming fuel and oxidant causes the catalyst bearing particulate solids to intermittently move into and out of contact with the respective electrodes. In any fuel cell system two of the rate controlling steps are in bringing the electrolyte and reactant, i.e. fuel or oxidant, to the catalyst site and removing the products therefrom. In each half cell this involves both adsorption of reactant and desorption of products. In the cell and process of this invention the time consuming steps of adsorption and desorption may be effected in the catalyst slurry while the catalyst bearing particle is out of contact with the electrode. This leaves the available electrode surface free to accept contact with catalyst comprising particles bearing fuel or oxygen which lack only contact with the electrode to complete the requisites for half cell reaction. Where the particle is both porous and conductive, the reaction sites are not limited to the exterior surfaces of the particle. Such sites may occur anywhere within the porous structure of the mobile particle where catalyst, electrolyte and reactant meet. This greatly increases the opportunities for reaction with each contact between a particle and an electrode.

The catalyst bearing particle preferably has both hydrophobic and hydrophilic components to allow for adsorption of both aqueous electrolyte and electrolyte immiscible fuels such as hydrocarbons. As aforementioned, the wetproofing of such catalyst particles may be effected by conventional techniques employed in the art for wetproofing the larger pores of gas diffusion electrodes, e.g. polymerization of a high molecular weight organic polymer such as polyethylene in situ, electrodeposition of minute particles of polymer such as polymers of tetrafluoroethylene and/or hexafluoropropylene. The wetproofing may be effected upon larger structures than the particles to be used prior to such being cut or broken up into particle size or may be applied after the catalyst comprising particle is in particulate form. When the fuel is soluble in the electrolyte, e.g. methyl alcohol, such division of surface conditions is unnecessary. The use of some of the catalyst upon the electrode surface, in addition to its carriage upon mobile particles, is also within the scope of this invention.

Catalyst particles or catalyst bearing particles may be withdrawn from the anolyte and catholyte compartments either continuously or intermittently for purposes of regeneration. This invention is not limited to the use of any specific catalyst and may be practiced utilizing any of the effective fuel cell catalysts known to the art such as metals of Groups I–B and VIII of the Periodic Table, manganese, tungsten, alloys of such metals with each other and other metals and compounds which include metals such as cobalt molybdate, manganese molybdate, etc. Likewise, the catalyst employed in the anolyte may be the same or different from that employed in the catholyte in accordance with the known catalytic properties of the specific catalyst chosen to promote the half cell reaction for which it is employed.

The concentration of particulate solids in the anolyte and catholyte compartments can be varied over a broad range to obtain good cell performance. The actual concentration used will be selected to give good fluidity within the cell. This selection will then be influenced by particle size distribution, particle density, particle shape, fluidizing velocity, fluid density and viscosity, etc. While all of the above factors influence particulate, solid fluidization, the concentration of solids may vary in the range of about 2 to 20 pounds of solids per gallon of electrolyte and in most embodiments will be in the range of 5 to 15 pounds per gallon.

The rate of flow of fuel and oxidant to their respective compartments can also be varied over a wide range and will be selected in accordance with cell size and design, catalyst concentration, size and density, electrolyte composition and concentration, and composition of fuel and oxidizing gas. Where air is employed as the oxidant the charge of air to the cell will ordinarily be at least double the amount required as reactant. Excess amounts of fuel may also be employed and it is within the scope of this invention to provide supplementary agitation to the catalyst bearing slurries by extraneous mechanical agitation.

Referring now to the accompanying drawings, FIG. 1 shows a schematic side view of one embodiment of the present invention showing the interior of the cell in cross section wherein anolyte and catholyte compartments containing a slurry of catalyst comprising, conductive, particulate solids in electrolyte are separated by a central reaction zone comprising two parallel wire screen electrodes which in turn are spaced apart to admit between such electrodes an electrolyte permeable membrane.

Figure 2:
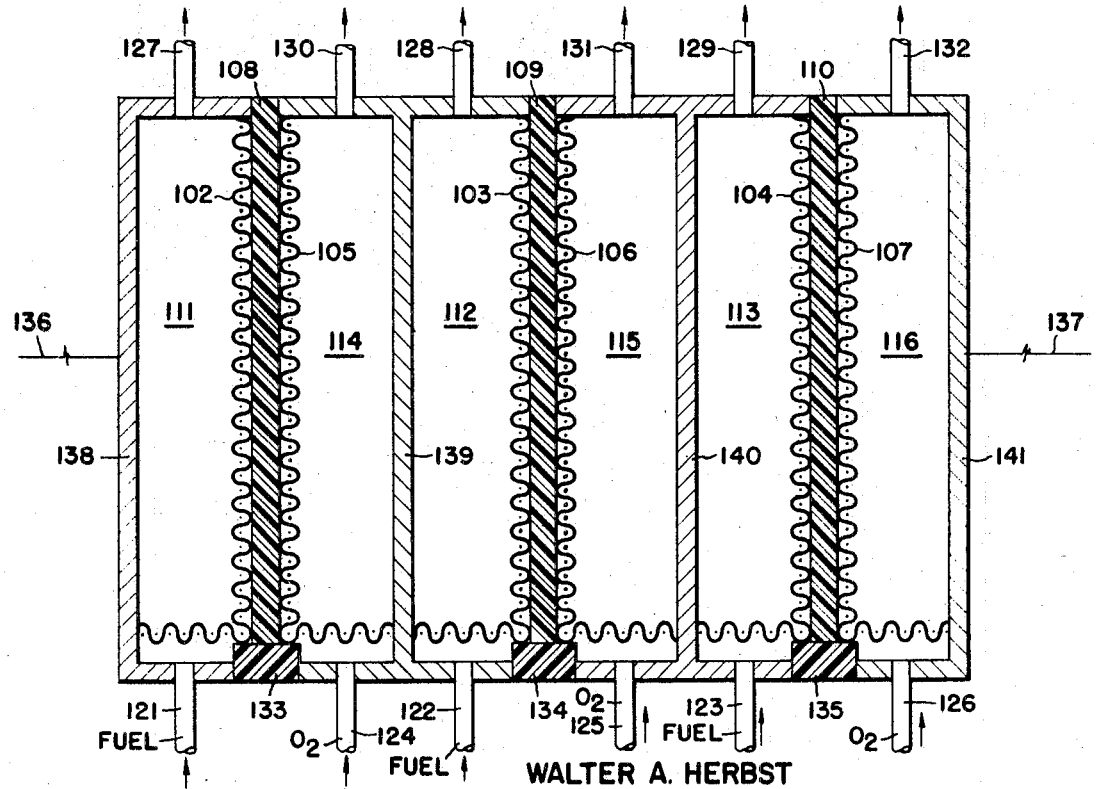

FIG. 2 shows a similar schematic side view of a group of cells similar to the type shown in FIG. 1 connected in series so as to fit into a compact fuel cell pack. The cells in FIG. 2 differ from the cell in FIG. 1 in that the anolyte and catholyte compartments are formed of electron conductive materials, e.g. stainless steel, and the paths for electron conduction between electrodes of the same cell are broken by the nonconductive electrolyte spacer and an additioinal insulator.

Figure 3:
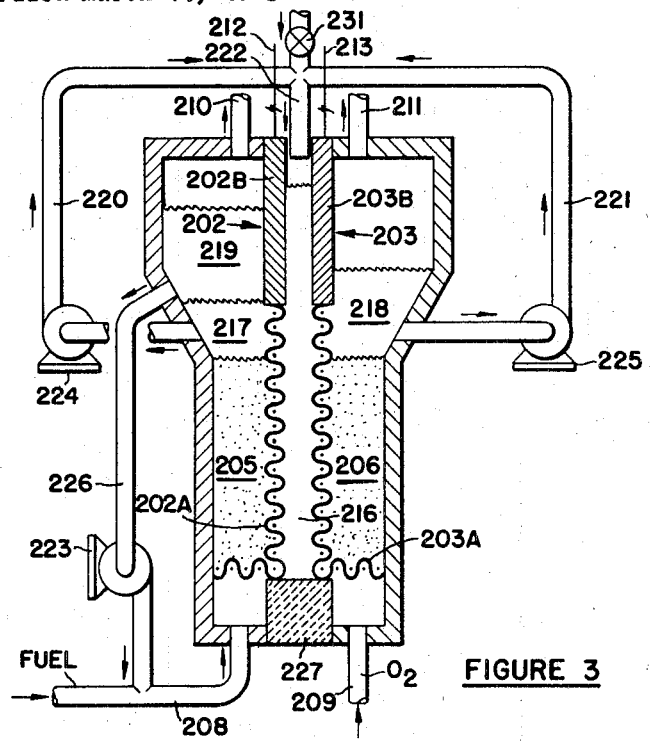

FIG. 3 shows a similar schematic side view of a different embodiment of the present invention wherein a liquid fuel and the catalyst of the anolyte are separated from the oxidizing gas and catalyst of the catholyte by an intermediate column of catalyst free electrolyte which continuously flows into the anolyte and catholyte compartments.

Referring first to FIG. 1, a schematic sectional side view of a single cell, there is shown a cell container 1, which is non-conductive material, e.g. glass; porcelain; eletrolyte resistant solid, organic polymer; etc. Cell container 1 is divided into an anolyte compartment 5 and a catholyte compartment 6 by a central reaction assembly comprising anode 2, cathode 3 and electrolyte permeable electrode spacer 4. Anode 2 and cathode 3 are wire screens of fine mesh resistant to attack by the electrolyte. The choice of metal for screens 2 and 4 will be somewhat controlled by the choice of electrolyte. In a basic medium metals such as nickel will be found suitable whereas with strong acid electrolytes it may be necessary to plate the electrode with a noble metal or use acid resistant alloys. Electrode spacer 4 is electrolyte permeable so as to admit of ionic transfer between anode and cathode. Various ion exchange membranes suitable for this purpose, which when saturated with electrolyte essentially prevent union of unreacted fuel and oxidizing gas, are well known in the art and as such do not comprise a part of this invention. See, for example, H. P. Gregor et al., Journal of Physical Chemistry, pages 141, 147 and 151, vol. 61 (1957); U.S. Pats. 2,636,851 and 2,913,511 and British Pat. 794,471; etc. Other ion permeable nonconductors, e.g. porous earthenware or ceramics, electrolyte resistant fiber mats, etc. which effect the same purpose may be substituted for the membranes described. In anolyte compartment 5 and catholyte compartment 6 are shown electrically conductive, catalyst bearing, solid particles 14 and 15 which are either porous or otherwise constructed to have a high surface area per unit of volume, slurried in a liquid electrolyte, e.g. $H_2SO_4$, KOH, etc. The particles 14 in the anolyte compartment may be the same as or different from the particles 15 in the catholyte compartment. When a liquid or gaseous combustible fuel is admitted to anolyte compartment 5 via fuel inlet conduit 8 at a rate sufficient to fluidize particles 14 in compartment 5 these particles bearing adsorbed electrolyte and fuel in contact with the catalyst thereon are brought into random contact with wire screen anode 2. If at the same time oxidizing gas is admitted to catholyte compartment 6 via oxidizing gas inlet conduit 9 at a rate sufficient to fluidize particles 15 in compartment 6 these particles bearing absorbed electrolyte and oxygen or other oxidant gas in contact with the catalyst thereon are brought into random contact with wire screen cathode 3. Upon contact of particles 14 and 15 with electrodes 2 and 3 as above described all requirements for the anodic and cathodic half cell reactions respectively are fulfilled. Reaction is effected on or within the conductive particles with release of electrons to anode 2, receipt of electrons from cathode 3 and ionic conductance between electrodes. Desorption of reaction products from such particles may occur during contact with electrode and/or as such particle moves back into slurry out of contact with the respective electrodes. Additional reactant is adsorbed and the cycle is repeated. Exhaust gases from anolyte compartment 5 exit via conduit 10. These may include water vapor from the electrolyte and water formed in the reaction, carbon dioxide when organic fuels are employed, partially oxidized fuel, and unreacted fuel which may be recovered and recycled to compartment 5 by means known to the art. In embodiments designed primarily for chemical production, partially oxidized fuel, e.g. alcohols, ketones, carboxylic acids, etc., may be separated from the unreacted fuel and recovered prior to return of fuel to compartment 5. Exhaust gases from catholyte compartment 6 are removed via conduit 11. These may include unreacted oxidant gas and inert gases such as nitrogen when air is employed as the oxidizing gas. It is also within the purview of this invention to collect water removed from the cell via conduits 10 and 11 for recycle to the cell as an aid in maintaining temperature control. In FIG. 1 wire mesh electrodes 2 and 3 are shown extending so as to cover ports of entry 8 and 9 to prevent escape of catalyst particles and diffuse the flow of the incoming streams. In the alternative this function may be accomplished by separate screens or grids which have a mesh of smaller diameter than that of the catalyst particles employed. Wires 12 and 13 represent leads from a single cell to an external circuit not shown through which electrons pass, may be used to do work, and return to the cell completing the electrical circuit.

FIG. 2 shows three cells of the type just described modified for bipolar connection and arranged for use in series in a cell pack. FIG. 2 is a sectional side view of the interior of a cell pack with outer cover, collecting conduits, etc. removed as well as the cell walls facing the viewer and their corresponding opposing cell walls. This serves to illustrate the interior of the cells. In FIG. 2 the anolyte compartments are designated as 111, 112 and 113, the anodes as 102, 103 and 104; the electrode spacers or membranes as 108, 109 and 110; the fuel inlet conduits as 121, 122 and 123; the anolyte exhaust conduits as 127, 128 and 129; the oxidant inlet conduits as 124, 125 and 126; the catholyte exhaust conduits as 130, 131 and 132; insulators 133, 134 and 135; and the wire leads to an external portion of the electrical circuit, not shown, are 136 and 137. Here, however, such leads receive and transmit current for the entire cell pack. In FIG. 2 individual cells are connected in series and separated by bipolar conductors 138, 139, 140 and 141. Conductors 139 and 140 are shown as I frames. Thus, conductor 139 separates catholyte compartment 114 from anolyte compartment 112 and establishes electrical connection between cathode 105 and anode 103 while 140 performs the same function with compartments 115, 113 and electrodes 106 and 104. Conductors 138 and 141 are shown as U shaped members employed with the end cells of a pack and cooperate here with electrodes 102 and 107 to help form compartments 111 and 116 respectively and connect with lead wires 136 and 137. Insulators 133, 134 and 135 are here shown below the electrodes providing support therefor and, of course, primarily function as means for preventing electrical connection between electrodes of the same cell in the electrolyte zone. Separation of the electrodes at the top is here shown only by the electrolyte containing membranes but it is to be understood that in accordance with engineering of various cell embodiments other insulative materials may be employed wherever necessary in accordance with conventional electrical assembly.

The other two sides of these compartments are not shown but are formed by individual plates or signal plates extending along the entire bank of cells with appropriately placed insulative materials to prevent electrical connection between electrodes of the same cell or other shorting of the circuit.

In FIG. 3, there is shown a schematic sectional side view of a different cell design for employing particulate catalyst in slurry with electrolyte wherein a liquid curtain of electrolyte is employed to separate the reactants of the anolyte and catholyte compartments. In FIG. 3 the cell is divided into anolyte compartment 205 and catholyte compartment 206 by a central reaction zone comprising an anode 202 and a cathode 203 spaced apart and forming a central electrolyte compartment 216. Anode 202 and cathode 203 each have a lower wire screen member 202A and 203A in electrical connection with an upper solid metal sheet member 202B and 203B respectively. Fresh fuel is admitted to anolyte compartment 205 via inlet conduit 208. Oxygen or air is admitted to catholyte compartment via inlet conduit 209. Exhaust gases are removed from compartment 205 via conduit 210 and from compartment 206 via conduit 211. Compartments 205 and 206 are tapered so as to expand in cross sectional area in their upper portions. Electrode screens 202A and 203A are shaped to cross over the fuel and air inlets so as to prevent loss of particulate catalyst and to diffuse incoming fuel and oxidant. Separate screens may be employed for this purpose, if desired. Catalyst free electrolyte zones 217 and 218 are formed in the expanded section of the reactor as shown in the drawing. Liquid fuel which is not used up in the anolyte half cell reaction and is of lower specific gravity than the electrolyte passes upwardly in compartment 205 and forms a fuel layer above the catalyst free electrolyte zone 217 at a level here designated as fuel recovery zone 219. Fuel from zone 219 of compartment 205 may be tapped from zone 219 and passed via conduit 226 and pump 223 back to the fuel inlet conduit 208 as shown or the flow through 226 may be recycled to the lower part of compartment 205 independently of conduit 208. Heat transfer means may be associated with conduit 226.

In certain embodiments, particularly wherein the cell is operated for the dual purpose of generating electrical energy and producing a chemical product, i.e. a partial oxidation product of the fuel, a product drawoff can be installed in the lower portion of compartment 205 when such product has a greater specific gravity than the electrolyte. Catalyst free electrolyte in zones 217 and 218 is continuously withdrawn and passed to central electrolyte compartment 216 via conduits 220, 221 and 222 and pumps 224 and 225. The electrolyte in compartment 216 is maintained at a higher level than that in compartments 205 and 206 so that the net flow of electrolyte is outward from compartment 216 into compartments 205 and 206 below the solid portions of the electrodes 202B and 203B providing a liquid curtain to separate fuel and oxidizing gas while maintaining a medium for ionic conductance between electrodes 202 and 203. Valve 231 is provided on conduit 222 to admit additional electrolyte to the system as needed. Insulator 227 shown only as positioned below the electrodes to prevent electrical connection between opposite sides of the cell is representative of all insulative members that may be employed in accordance with conventional practice and the design here shown. In FIG. 3 wire leads 212 and 213 represent the beginning of an external electrical circuit for use in a unipolar type of connection with other cells or where the cell is employed by itself.

Obviously, the unipolar design in FIG. 3 without change admits of bipolar connection with other cells in series or parallel with properly shaped connector plates and appropriately placed insulators and by reversing the anolyte and catholyte compartments of adjacent cells for series connection. It also should be understood that the flaring of the upper portion of the cell can be rotated 90° in a horizontal plane so that the electrodes have the flared shape displayed by the side view of the cell in FIG. 3 in which case the opposing walls of the anolyte and catholyte compartments may be straight and adaptable to bipolar connection as shown in FIG. 2.

It further should be understood that the embodiments employing the electrolyte curtain feature of FIG. 3 are not confined to the specific design shown therein and that the flared upper portion of the anolyte and catholyte compartments shown therein is not confined to use with a cell divider of this type. Hence in other embodiments not shown such liquid curtain may be employed where the unreacted fuel is carried out of the cell as in FIGS. 1, 2 and 3 or otherwise and recovered from an external settling zone. In the case of a gaseous fuel the fuel may be separated by conventional gas separation techniques from carbon dioxide and/or partial oxidation products and/or electrolyte and thence recycled. Means may also be incorporated in the foregoing designs for periodic or continuous withdrawal of catalyst for regeneration and the return of same or fresh catalyst.

It will be obvious that other modifications may be made within the spirit of the present invention and it is intended to cover such by the following claims so far as the prior art permits. Thus, for example, it may prove advantageous in certain embodiments to contact the catalyst bearing particles with fuel outside the cell and introduce the same with fuel adsorbed to the electrolyte in a continuous process.

Volume efficiency as employed herein refers to the amount of electrical power which can be obtained from a unit volume of a fuel cell.

What is claimed is:

1. A fuel cell comprising in combination a first compartment, a second compartment, a first transfer means for introducing a fluid fuel to said first compartment, a second transfer means for introducing an oxidizing gas to said second compartment, and a central reactor assembly comprising at least two electrolyte permeable electrodes providing an anode and a cathode, a catalyst free electrolyte between and in contact with such electrodes providing a medium for ionic transfer therebetween, and conducting means establishing electrical connection between said anode and cathode external to said electrolyte, said assembly positioned between and communicating with said first compartment and said second compartment, said first compartment and said second compartment each charged with a liquid electrolyte slurry of electron-conductive, catalyst-comprising, particulate solids so as to admit of contact with said anode and said cathode respectively when fuel is admitted to said first compartment and oxidizing gas is admitted to said second compartment.

2. A fuel cell in accordance with claim 1 wherein at least one of said electrodes comprises a wire screen impermeable to catalyst comprising particles having a diameter above about 104 microns.

3. A fuel cell in accordance with claim 1 wherein at least one of such electrodes comprises a porous metal sheet impermeable to catalyst comprising particles having a diameter above about 104 microns.

4. A fuel cell in accordance with claim 1 wherein said solids comprise porous carbon impregnated with metal.

5. In the operation of a fuel cell which comprises in combination a first compartment charged with a liquid electrolyte slurry of electron-conductive, catalyst-comprising, particulate solids, a second compartment charged with an electrolyte slurry of electron-conductive, catalyst-comprising, particulate solids, a first conduit for introducing a fluid organic fuel into a lower part of said first compartment, a second conduit for introducing an oxidizing gas into a lower part of said second compartment, electrolyte permeable electrodes providing an anode and a cathode spaced apart between said first compartment and said second compartment so that said anode is in communication with said first compartment and said cathode is in communication with said second compartment, a central electrolyte zone between said anode and said cathode, and conducting means establishing electrical connection between said anode and said cathode external to said electrolyte zone, the improvement which comprises maintaining a continuous flow of liquid electrolyte through said central electrolyte zone into said first compartment and said second compartment thereby establishing a liquid curtain between said first compartment and said second compartment.

6. In a method in accordance with claim 5 wherein catalyst-free electrolyte is continuously removed from an upper part of said first compartment and from an upper part of said second compartment and introduced into said central electrolyte zone at a level above the level of such removal.

7. In a method in accordance with claim 5 wherein the upper part of said first compartment is larger than the lower part of said first compartment and unreacted fuel is continuously withdrawn from said upper part and recycled to said lower part.

8. In a method for generating electrical current by the electrochemical oxidation of a fuel, in which said fuel is contacted with solid catalytic electrode material and aqueous electrolyte in an oxidation zone and oxygen-containing material is contacted with solid catalytic electrode material and aqueous electrolyte in a depolarization zone, the improvement which comprises the steps: maintaining the catalytic electrode material in at least one of said zones in suspension, in the form of a slurry of particulate solids occupying the entire zone and being separated from the catalytic electrode material in the other zone by a catalyst-free ion transferring electrolyte, continuously contacting said catalytic electrode material, including said slurry of particulate solids, with said aqueous electrolyte and with their respective fuel and oxidant reactants, collecting electrons in said oxidation zone released by the oxidation reaction at the active sites in the electrode material contacting said fuel, and transporting said electrons through an external conductive path to the active sites in the electrode material contacting said oxygen-containing material in said depolarizing zone.

References Cited
UNITED STATES PATENTS

| | | | |
|---|---|---|---|
| 2,913,511 | 11/1959 | Grubb | 136—86 |
| 2,901,522 | 8/1959 | Bopp | 136—86 |
| 2,781,248 | 2/1957 | Gorin | 23—212 |
| 2,901,524 | 8/1959 | Gorin | 136—86 |
| 3,031,286 | 4/1962 | Bartholome et al. | 23—212 |
| 2,925,454 | 2/1960 | Justi et al. | 136—86 |
| 2,962,362 | 11/1960 | Moorman | 260—683.3 |

FOREIGN PATENTS
206,025   10/1959   Austria.

WINSTON A. DOUGLAS, Primary Examiner

H. A. FEELEY, Assistant Examiner